United States Patent
Stephens et al.

(10) Patent No.: US 10,334,031 B2
(45) Date of Patent: *Jun. 25, 2019

(54) LOAD BALANCING BASED ON IMPENDING GARBAGE COLLECTION IN EXECUTION ENVIRONMENT

(75) Inventors: Maoni Z. Stephens, Sammamish, WA (US); Patrick H. Dussud, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1187 days.

This patent is subject to a terminal disclaimer.

(21) Appl. No.: 13/540,615

(22) Filed: Jul. 3, 2012

(65) Prior Publication Data

US 2012/0278813 A1 Nov. 1, 2012

Related U.S. Application Data

(63) Continuation of application No. 11/254,649, filed on Oct. 20, 2005, now Pat. No. 8,234,378.

(51) Int. Cl.
*G06F 9/50* (2006.01)
*G06F 9/52* (2006.01)
*G06F 9/455* (2018.01)
*H04L 29/08* (2006.01)

(52) U.S. Cl.
CPC ........ *H04L 67/1008* (2013.01); *G06F 9/5083* (2013.01); *H04L 67/1002* (2013.01); *H04L 67/1012* (2013.01); *G06F 9/528* (2013.01); *G06F 2009/4557* (2013.01)

(58) Field of Classification Search
CPC ............ H04L 67/1008; H04L 67/1002; H04L 67/1012; G06F 9/5083; G06F 9/528; G06F 2009/4557
See application file for complete search history.

(56) References Cited

U.S. PATENT DOCUMENTS

| 5,339,411 | A |   | 8/1994 | Heaton, Jr. |
|-----------|---|---|--------|-------------|
| 5,619,701 | A |   | 4/1997 | Neti |
| 5,745,703 | A | * | 4/1998 | Cejtin et al. ............. 395/200.68 |
| 5,893,159 | A |   | 4/1999 | Schneider |
| 5,938,722 | A | * | 8/1999 | Johnson .................. G06F 9/461 709/226 |
| 6,065,020 | A |   | 5/2000 | Dussud |
| 6,341,293 | B1 |  | 1/2002 | Hennessey |

(Continued)

FOREIGN PATENT DOCUMENTS

| CA | 2132672 A1 | 3/1995 |
|----|-----------|--------|
| EP | 645702 B1 | 8/2000 |

(Continued)

OTHER PUBLICATIONS

Hailperin, "Load Balancing Using Time Series Analysis for Soft Real Time Systems with Statistically Periodic Loads", Dec. 1993.*

(Continued)

*Primary Examiner* — Wynuel S Aqunio
*Assistant Examiner* — Kevin X Lu
(74) *Attorney, Agent, or Firm* — Dicke, Billig & Czaja, PLLC

(57) ABSTRACT

Efforts to avoid time-outs during execution of an application in a managed execution environment may be implemented by monitoring memory allocation.

17 Claims, 4 Drawing Sheets

(56) References Cited

U.S. PATENT DOCUMENTS

| | | | |
|---|---|---|---|
| 6,389,448 B1 | 5/2002 | Primak | |
| 6,393,458 B1 | 5/2002 | Gigliotti | |
| 6,397,252 B1 | 5/2002 | Sadiq | |
| 6,446,134 B1 | 9/2002 | Nakamura | |
| 6,505,275 B1 | 1/2003 | Weissman et al. | |
| 6,571,270 B1 | 5/2003 | Lai | |
| 6,842,759 B2* | 1/2005 | Haggar et al. | |
| 6,856,991 B1 | 2/2005 | Srivastava | |
| 6,865,591 B1 | 3/2005 | Garg | |
| 6,886,035 B2 | 4/2005 | Wolff | |
| 7,325,118 B2 | 1/2008 | Lee | |
| 7,330,872 B2 | 2/2008 | Peart | |
| 7,565,497 B1* | 7/2009 | Garthwaite | G06F 12/0269 711/158 |
| 7,685,580 B1* | 3/2010 | Detlefs | G06F 12/0253 717/140 |
| 8,234,378 B2 | 7/2012 | Stephens et al. | |
| 2002/0078002 A1* | 6/2002 | Bottomley et al. | 707/1 |
| 2002/0091786 A1 | 7/2002 | Yamaguchi | |
| 2002/0143848 A1 | 10/2002 | Matena | |
| 2003/0167421 A1* | 9/2003 | Klemm | G06F 9/3861 714/37 |
| 2003/0212719 A1* | 11/2003 | Yasuda | G06F 12/0276 |
| 2003/0236888 A1 | 12/2003 | Chauffour | |
| 2004/0003029 A1 | 1/2004 | Islam | |
| 2004/0068561 A1 | 4/2004 | Yamamoto | |
| 2004/0162901 A1 | 8/2004 | Mangipudi | |
| 2004/0250248 A1 | 12/2004 | Halpern | |
| 2004/0268358 A1 | 12/2004 | Darling | |
| 2005/0015685 A1 | 1/2005 | Yamamoto | |
| 2005/0028140 A1 | 2/2005 | Ayachitula | |
| 2005/0055696 A1 | 3/2005 | Betzler | |
| 2005/0071597 A1 | 3/2005 | Lee | |
| 2005/0102393 A1 | 5/2005 | Murray | |
| 2005/0102400 A1 | 5/2005 | Nakahara | |
| 2005/0114413 A1* | 5/2005 | Subramoney | G06F 12/0269 |
| 2005/0114480 A1 | 5/2005 | Ramamoorthy | |
| 2005/0160416 A1 | 7/2005 | Jamison | |
| 2005/0193066 A1* | 9/2005 | Adams | G06F 9/542 709/206 |
| 2005/0198088 A1 | 9/2005 | Subramoney | |
| 2005/0240641 A1* | 10/2005 | Kimura | G06F 12/0253 |
| 2006/0037004 A1* | 2/2006 | Long et al. | 717/127 |
| 2007/0016633 A1* | 1/2007 | Lindholm | G06F 12/0269 |
| 2007/0033581 A1* | 2/2007 | Tomlin | G06F 13/1694 717/154 |
| 2007/0094651 A1 | 4/2007 | Stephens et al. | |

FOREIGN PATENT DOCUMENTS

| | | | |
|---|---|---|---|
| EP | 1307018 A1 | 5/2003 | |
| JP | 2006202279 A | 8/2006 | |
| JP | 2008505405 A | 2/2008 | |
| WO | WO 2000005652 A1 * | 1/2000 | G06F 12/02 |
| WO | 005652 A1 | 2/2000 | |
| WO | 2004071050 A1 | 8/2004 | |
| WO | 2004077259 A2 | 9/2004 | |
| WO | 2004099985 A1 | 11/2004 | |
| WO | 2005045683 A1 | 5/2005 | |

OTHER PUBLICATIONS

Weissman, et al., "A Performance Evaluation of Fine-Grain Thread Migration with Active Threads", TR-97-054, Dec. 1997.*
Hailperin, "Load Balancing Using Time Series Analysis for Soft Real Time Systems with Statistically Periodic Loads," 1993.*
CL Third Office Action for Application No. 2650-2006, Reference 313866.05, dated Jun. 19, 2013.
IN First Examination Report for Application No. 2107/CHENP/2008, dated Aug. 14, 2014.
U.S. Appl. No. 11/254,649, filed Oct. 20, 2005, Stephens.
U.S. Appl. No. 11/255,119, filed Oct. 20, 2005, Stephens.
European Patent Office, Examiner Torkild Dewyn, EP Communication for Application No. 06815819.5-1957, pp. 1-4, dated May 31, 2016, Netherlands.
CN Notice on the Second Office Action for Application No. 200680039145.6, dated Jun. 7, 2010.
CN the First Office Action for Application No. 200680039145.6, dated Jul. 17, 2009.
EP Communication for Application No. 06 815 819.5-1957, Reference EP57359TE900kap, dated Nov. 17, 2015.
Balakrishnan, "The Impact of Performance Asymmetry in Emerging Multicore Architectures", In Proceedings of the 32nd International Symposium on Computer Architecture, Jun. 4, 2005.
EP Communication and Supplementary European Search Report for Application No. 06815819.5-1243/1941382, Reference EP57358TE900kap, dated Apr. 23, 2009.
NZ Examination Report for Application No. 567314, Reference 606263 MDA, dated Oct. 27, 2009.
"Coyote Point Systems Inc.", Retrieved From:«http://www.coyotepoint.com/products.htm», Oct. 20, 2005, 2 Pages.
"MAONI's Weblog; Using GC Efficiently—Part 4", Retrieved From «http://blogs.msdn.com/maoni/default.aspx», Oct. 20, 2005, 25 Page.
"Roboman NT/2000—Windows Load Balancing Intelligent Solution Set; Manage Many Windows load Balancing Environment Better", Retrieved From «http://www.heroix.com/Downloads/pdf/Datesheet_WLBS.pdf, Jan. 2003, 2 Pages.
"Search Report Issued in European Patent Application No. 06815819.5", dated Jan. 28, 2009, 6 Pages.
"Final Office Action Issued in U.S. Appl. No. 11/254,649", dated Dec. 12, 2008, 12 Pages.
"Final Office Action Issued in U.S. Appl. No. 11/254,649", dated Dec. 8, 2010, 12 Pages.
"Non-Final Office Action Issued in U.S. Appl. No. 11/254,649", dated Jun. 30, 2008, 13 Pages.
"Non-Final Office Action Issued in U.S. Appl. No. 11/254,649", dated Jun. 25, 2009, 11 Pages.
"Non-Final Office Action Issued in U.S. Appl. No. 11/254,649", dated Jan. 26, 2010, 10 Pages.
"Non-Final Office Action Issued in U.S. Appl. No. 11/254,649", dated Aug. 5, 2010, 11 Pages.
"Notice of Allowance Issued in U.S. Appl. No. 11/254,649", dated Jan. 19, 2012, 7 Pages.
"Notice of Allowance Issued in U.S. Appl. No. 11/254,649", dated Mar. 26, 2012, 8 Pages.
"Office Action Issued in Philippines Patent Application No. 1-2008-500671", dated Apr. 6, 2011, 1 Page.
"Notice of Allowance Issued in Norway Patent Application No. 20081268", dated Sep. 29, 2017, 2 Pages. (W/o English Translation).
"Notice of Allowance Issued in Japanese Patent Application No. 2008-536593", dated Feb. 14, 2012, 6 Pages.
"Office Action Issued in Japanese Patent Application No. 2008-536593", dated Oct. 25, 2011, 4 Pages.
"Notice of Allowance Issued in Indian Patent Application No. 2107/CHENP/2008", dated Mar. 9, 2017, 2 Pages.
"Notice of Allowance Issued in New Zealand Patent Application No. 567314", dated Apr. 29, 2010, 1 Page.
Arregui, et al., "Rule-Based Transactional Object Migration over a Reflective Middleware", In International Conference on Distributed Systems Platforms and Open Distributed Processing, Nov. 12, 2001, pp. 179-196.
Chawla, Sumit, "Fine-Tuning Java Garbage Collection Performance", Retrieved From: «www.ibm.com/developerworks/ibm/library/i-gctroub/», Jan. 1, 2003, 10 Pages.
Cobra, "Product Openfusion CORBA ® Services", Retrieved From «http://www.corba.org/vendors/pages/prismtech2003.htm», Oct. 20, 2005, 6 Pages.
Hailperin, Max, "Load Balancing Using Time Series Analysis for Soft Real Time Systems with Statistical Periodic Loads", In the Thesis in Department of Computer Science, Stanford University, Dec. 1993, 147 Pages.

(56) References Cited

OTHER PUBLICATIONS

Huelsbergen, et al., "A Concurrent Copying Garbage Collector for Languages that Distinguish (Im)mutable Data", In ACM SIGPLAN Notices, vol. 28, Issue 7, Aug. 1, 1993, pp. 73-82.

Michael, Tuton, "Access Manager Policy Server Clusters", Retrieved From:«http://www-128.ibm.com/developerworks/tivoli/library/t-clusters/», Dec. 1, 2002, 13 Pages.

Pentakalos, Odysseas, "Tuning J2EE Application Servers", In International Computer Measurement Group Conference, Dec. 7, 2001, 12 Pages.

"International Search Report Issued in PCT Application No. PCT/US06/038117", dated Feb. 1, 2007, 3 Pages.

Pertet, Soila M., "Proactive Fault-Recovery in Distributed Systems", In the Science Thesis—Carnegie Mellon University, May 1, 2004, 40 Pages.

Wollman, et al., "Plug and Play Server Load Balancing and Global Server Load Balancing for Tactical Networks", In Proceedings of Military Communications Conference, Oct. 13, 2003, 5 Pages.

Zhu, et al., "Migration Impact on Load Balancing—An Experience on Amoeba", In ACM SIGOPS Operating Systems Review, vol. 31, Issue 1, Jan. 1, 1997, 11 Pages.

"Final Office Action Issued in U.S. Appl. No. 11/255,119", dated Nov. 17, 2009, 15 Pages.

"Non Final Office Action Issued in U.S. Appl. No. 11/255,119", dated May 14, 2009, 9 Pages.

"Notice of Allowance Issued in U.S. Appl. No. 11/255,119", dated Dec. 9, 2010, 10 Pages.

"Notice of Allowance Issued in U.S. Appl. No. 11/255,119", dated Dec. 28, 2010, 11 Pages.

\* cited by examiner

LOAD BALANCING BASED ON IMPENDING GARBAGE COLLECTION IN EXECUTION ENVIRONMENT

CROSS-REFERENCE TO RELATED APPLICATIONS

This application is a Continuation of and claims benefit from U.S. patent application Ser. No. 11/254,649 that was filed on Oct. 20, 2005 and that is incorporated herein by reference in its entirety.

BACKGROUND

Memory management in a managed execution environment may include temporarily suspending managed threads during a sweep or scan of a memory heap. However, a prolonged suspension of the managed threads may time-out execution of the corresponding application.

SUMMARY

Execution of portions of an application, program, method, function, or other assemblage of code in a managed execution environment may be influenced by, at least, the potential magnitude of a memory management implementation.

DESCRIPTION OF THE DRAWINGS

Load balancing in a managed execution environment is presently described in accordance with the following figures.

DETAILED DESCRIPTION

Figure 1:
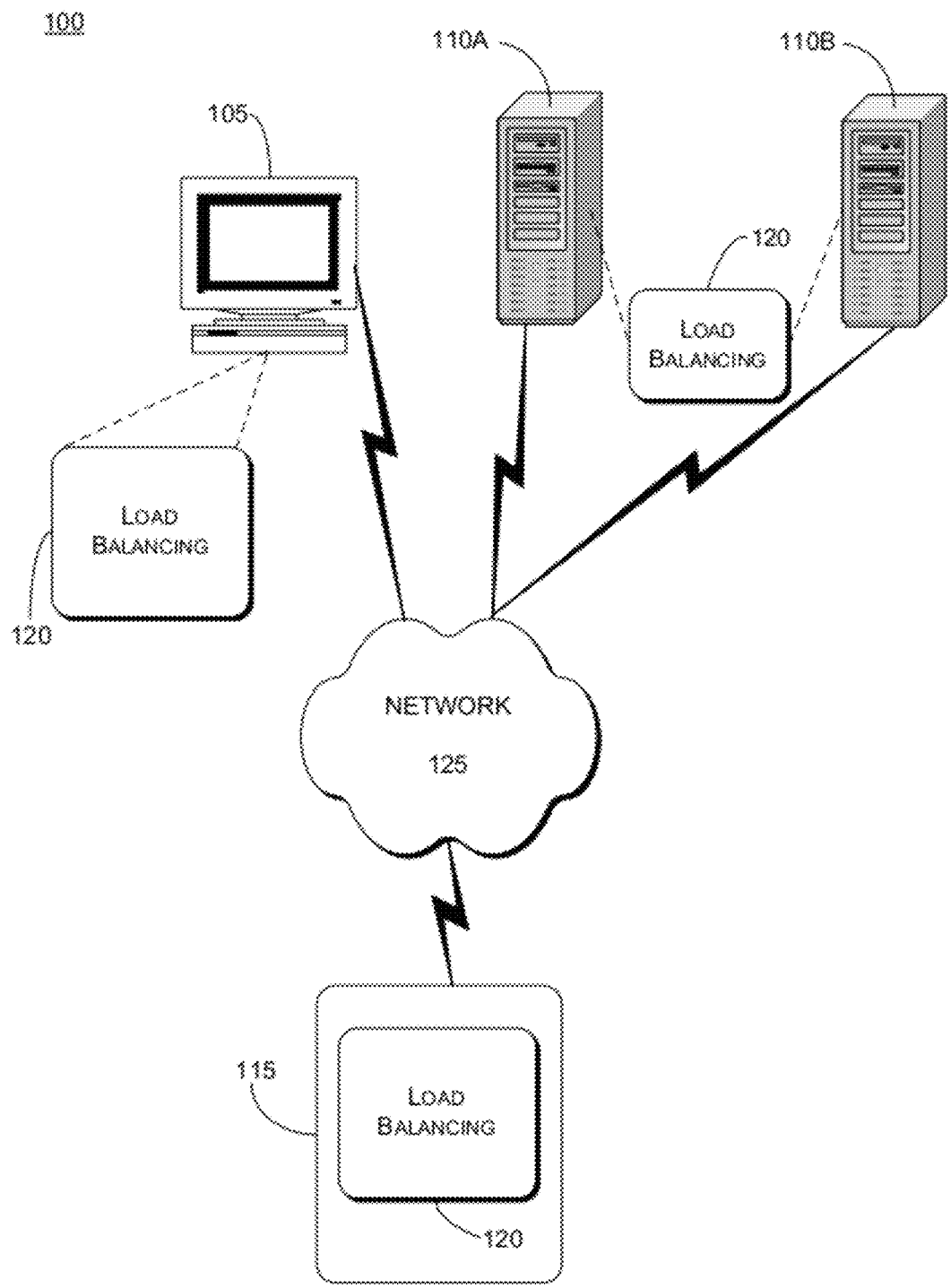
FIG. 1 shows devices communicating over a network, with the devices implementing example technologies for load balancing.

Load balancing is described herein. More particularly, the present description relates to controlling certain behavior of at least portions of an application, program, method, function, or other assemblage of code based on data regarding, at least, the potential magnitude of a memory management implementation in the respective execution environment.

Within the context of this detailed description and as pertaining to object-oriented programming, a method may be regarded as the processing that an object performs. Therefore, for instance, when a message is sent to an object, the method is implemented.

"Process," as described herein, may refer to the actual running of a module or assembly of code pertaining to an application, program, function, or other assemblage of programmable and executable code.

"Assembly," as described herein, may refer to a unit of deployment of code, which may or may not be versionable.

"Resource," as described herein, may include both physical and logical resources associated with a given computing environment. As non-limiting examples, such resources may range from files to ports to shared state; that is, any non-executable entity that may be shared by more than one executable entity.

"Threads," as described herein, may refer to execution paths within an application, program, function, or other assemblage of programmable and executable code. Threads enable multiple paths or streams of execution of modules of executable instructions to occur concurrently within the same application, program, function, or other assemblages of programmable and executable code; whereby, within each stream, a different transaction or message may be processed. A multitasking or multiprocessing environment, in which multi-threading processes may be executed, may be found in either a managed execution environment or an unmanaged execution environment.

"Isolation boundary," as described herein, may refer to a logical or physical construct that may serve as a unit of isolation. Processes are an example of an isolation boundary. Within a managed execution environment, such an isolation boundary may be referred to as an application domain, in which multiple threads of execution may be contained. Such terminology is provided as an example only. That is, the example implementations described herein are not limited to application domains or even to managed execution environments as stated above, but rather may be applied within various other isolation boundaries implementations in other execution environments. More particularly, isolation boundaries, as related to the scope of resource distribution described herein, may further pertain to machine boundaries, process boundaries, threads, and class or assembly boundaries. Even more particularly, the scope of resource distribution may pertain to public/private exposure, assemblies, or classes. Further, resource distribution may have multiple axis or annotations including, e.g., a type of resource as well as visibility of the resource.

Isolation boundaries may enable the code to be executed therein to be loaded from a specified source; an isolation boundary may be aborted independent of other such isolation boundaries; and processing within an isolation boundary may be isolated so that a fault occurring therein does not affect other isolation boundaries within the process. More particularly, isolation boundaries may isolate the consumption of resources therein to the extent that other isolation boundaries either do not see any changes to a resource or, rather, see the resources in a serialized, atomic fashion.

FIG. 1 shows example network environment 100 having processing nodes that may communicate with each other in various quantities and combinations thereof to implement one or more examples of load balancing. However, implementations of load balancing are not limited to nodes in a network environment. Still, in the example network environment of FIG. 1, client device 105, server devices 110A and 110B, and "other" device 115 may be communicatively coupled to one another via network 125; and, further, at least one of client device 105, server devices 110A and 110B, and "other" device 115 may be capable of implementing load balancing 120, as described herein.

Client device 105 may be at least one of a variety of conventional computing devices, including a desktop personal computer (PC), workstation, mainframe computer, Internet appliance, and set-top box. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server devices 110A and 110B may provide any of a variety of data and/or functionality to client device 105 or "other" device 115 in accordance with at least one implementation of load balancing 120. The data may be publicly available or alternatively restricted, e.g., restricted to only certain users or only if an appropriate subscription or licensing fee is paid. Either of server devices 110A and 110B may be a network server, an application server, or a blade server, in various quantities and combinations thereof. Typically, server devices 110A and 110B serve as content sources, and client device 105 receives such content either via network 125 or in an off-line manner. However, according to the example implementations described herein, client device 105 and server devices 110A and 110B may interchangeably be sending nodes or receiving nodes in network environment 100. Further, according to at least one example of load balancing 120, server devices 110A and 110B may be implemented as one of many server devices on network 125. Such configuration may be regarded, informally, as a "server farm." In such a server farm, the two or more networked servers may share in the execution of at least portions of a same application, program, function, or other assemblage of programmable and executable code. Further still, "other" device 115 may also be embodied by any of the above examples of server devices 110A and 110B.

"Other" device 115 may be any further device that is capable of implementing load balancing 120 according to one or more of the examples described herein. That is, "other" device 115 may be a software-enabled computing or processing device that is capable of implementing load balancing 120 for at least a portion of an application, program, function, or other assemblage of programmable and executable code in at least a managed execution environment. More particularly, "other" device 115 may serve as a load balancer. As a load balancer, "other" device 115 may be implemented as a hardware device that is physically separate from either of client device 105 or server devices 110A and 110B; alternatively, "other" device 115 may be implemented as firmware or software on at least one of client device 105 or server devices 110A and 110B. Thus, "other" device 115 may be a computing, processing, or server device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (also referred to, individually, as a "LAN"), such as an 802.11 system; a personal area network (i.e., PAN), such as Bluetooth.

Computer architecture in at least one of devices 105, 110A, 110B, and 115 has typically defined computing platforms in terms of hardware and software. Software for computing devices came to be categorized into groups, based on function, which include: a hardware abstraction layer (alternatively referred to as a "HAL"), an operating system (alternatively referred to as "OS"), and applications.

A runtime execution environment may refer to an isolated space, which may be between the OS and an application, in which the application may execute specific tasks on at least one of processing device 105, one or more of server devices 110A and 110B, or other device 115. More particularly, a runtime execution environment is intended to enhance the reliability of the execution of applications on a growing range of processing devices including servers, desktop computers, laptop computers, mobile processing devices, set-top boxes, and gaming consoles by providing a layer of abstraction and services for an application running on such processing devices, and further providing the application capabilities including memory management and configuration thereof.

A runtime execution environment may serve as at least one of an application programming and application execution platform.

As an application programming platform, a runtime execution environment may compile targeted applications, which may be written in one of multiple computing languages, into an intermediate language (hereafter "IL"). IL is typically independent of the platform and the central processing unit (hereafter "CPU") executes IL. In fact, IL is a higher level language than many CPU machine languages.

As an application execution platform, a runtime execution environment may interpret compiled IL into native machine instructions. A runtime execution environment may utilize either an interpreter or a "just-in-time" (hereafter "JIT") compiler to execute such instructions. Alternatively, a runtime execution environment may execute, read, interpret, or otherwise analyze intermediate language code (i.e., "IL") that is distributed to the runtime execution environment in IL format rather than in a native platform execution format and is already compiled into any one of assemblies, methods, or types. A source of such IL may be disposed in either of a non-managed execution environment or a separate implementation of the runtime execution environment on a same or separate one of devices 105, 110, and 115. The source may deploy the IL at, or prior to, install time for the application, program, method, function, or other assemblage of programmable and executable code to which the IL corresponds.

Regardless, the native machine instructions may then be directly executed by the CPU. Since IL is CPU-independent, IL may execute on a CPU platform as long as the OS running on that CPU platform hosts an appropriate runtime execution environment. Examples of runtime environments, to which load balancing 120 may pertain, include: Visual Basic runtime environment; Java® Virtual Machine runtime environment that is used to run, e.g., Java® routines; or Common Language Runtime (CLR) to compile, e.g., Microsoft-.NET™ applications into machine language before executing a calling routine. However, such listing provides examples only. The example implementations are not limited to just these managed execution environments. Further, the example implementations are not just limited to managed execution environments, for one or more examples may be implemented within testing environments and/or unmanaged execution environments.

An application compiled into IL may be referred to as "managed code," and therefore a runtime execution environment may be alternatively referred to as a "managed execution environment." Portions of managed code may be referred to as a "managed image." Code that does not utilize a runtime execution environment to execute may be referred to as native code applications.

Figure 2:
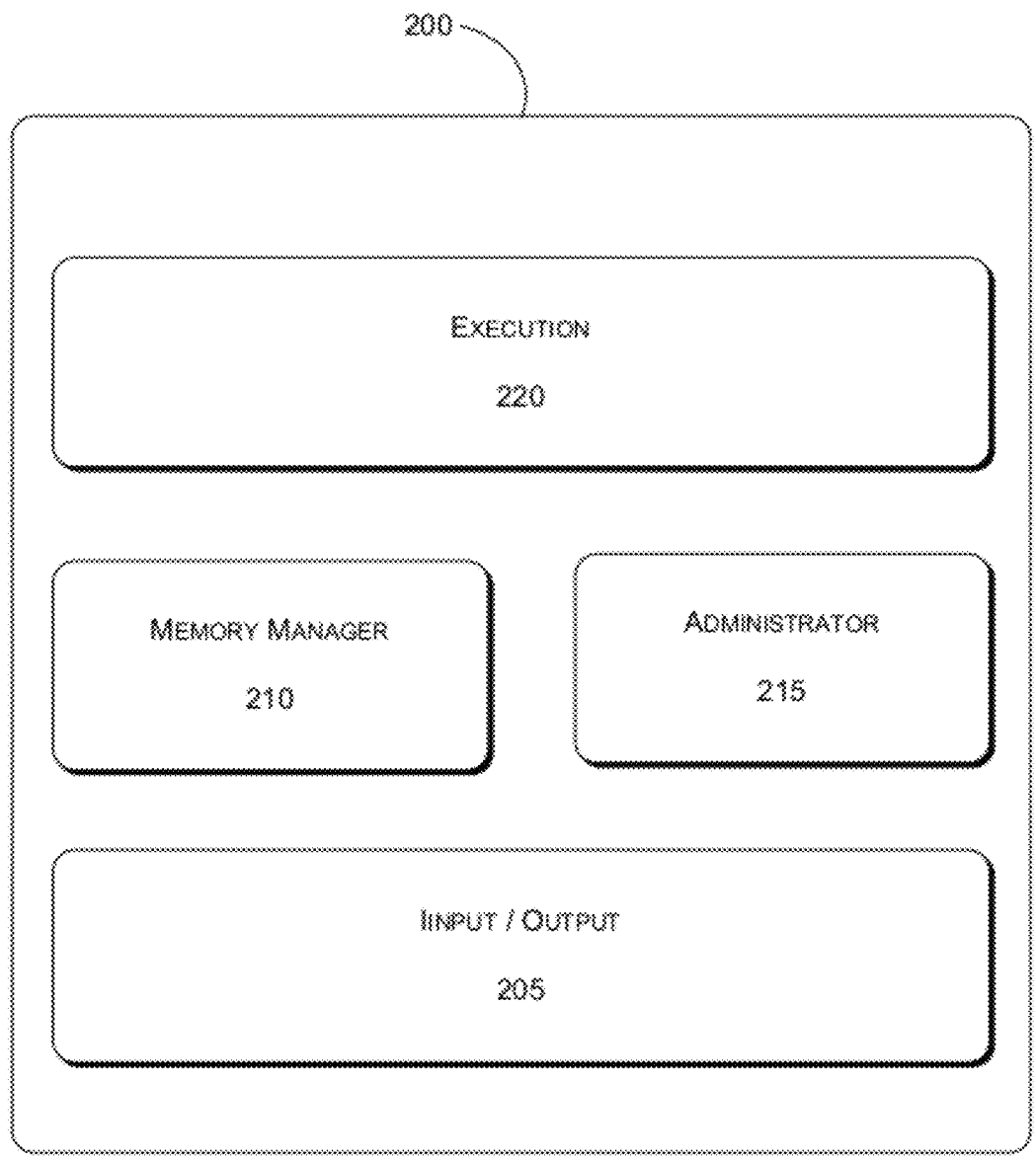
FIG. 2 shows an example of an execution environment for implementing example technologies for load balancing.

FIG. 2 shows an example of runtime execution environment 200 in which examples of load balancing 120 (see FIG. 1) may be implemented.

According to at least one example implementation, runtime execution environment 200 may facilitate execution of managed code for a computing device platform. Managed code may be considered to be part of a core set of application-development technologies, and may further be regarded as code that is compiled for execution on runtime execution environment 200 to provide a corresponding service to the computing device platform. In addition, runtime execution environment 200 may translate managed code at an interpretive level into instructions that may be proxied and then executed by a processor. A framework for runtime execution environment 200 may also provide class libraries, which may be regarded as software building blocks for managed applications.

According to a further example implementation, runtime execution environment 200 may provide at least partial functionality that may otherwise be expected from a kernel, which may or may not be lacking from a computing device platform depending upon resource constraints for any particular one of devices 105, 110A, 110B, and 115. Thus, at least one example of runtime execution environment 200 may implement the following: input/output (hereafter "I/O") routine management, memory management, administration, and service routine management. Thus, runtime execution environment 200 may include I/O component 205, at least one memory manager 210, administrator 215, and execution component 220. These components, which are to be described in further detail below, are provided as examples only; that is, the examples are not intended to be limiting to any particular implementation, and no such inference should be made. Further, the components may be implemented in examples of runtime execution environment 200 in various combinations and configurations thereof.

I/O component 205 of runtime execution environment 200 may provide asynchronous access to data sources (i.e., processor and peripherals) associated with the computing device platform. Examples of such data sources may be one or more of devices 105, 110A, 110B, and 115, described above with regard to FIG. 1. More particularly, I/O component 205 may provide runtime execution environment 200 with robust system throughput and further streamline performance of code from which an I/O request originates.

Memory manager 210 may refer to a module within or associated with runtime execution environment 200 that is regarded as a "garbage collector." Garbage collection (alternatively referred to hereafter as "GC") may be regarded as a robust feature of managed code execution environments by which an object is freed (i.e., de-allocated) if an object is no longer used by any applications, upon a sweep or scan of a memory heap. In at least one example of memory manager 210, a sweep of free memory heap may be implemented as a linear search. Such implementation may be well-suited for an example of a computing device platform for which memory size is constrained and for which a delay in completion of a sweep may be perceived by a user of a corresponding device.

An example of memory manager 210 may implement "concurrent GC" functionality to allow managed threads to continue to run during a sweep or scan of a memory heap. That is, during de-allocation, concurrent GC may allow allocation to continue in parallel. Concurrent GC functionality (alternatively referred to herein as "concurrent GC") may be suitable for an interactive or GUI (graphical user interface)-based application.

However, although load balancing 120 may be relevant to concurrent GC functionality, the present example implementations of load balancing 120 are described in the context of non-concurrent GC functionality, by which one or more managed threads may be suspended during a sweep or scan of a memory heap.

Further functions implemented by memory manager 210 may include: managing one or more contiguous blocks of finite volatile RAM (i.e., memory heap) storage or a set of contiguous blocks of memory amongst the tasks running on the computing device platform; allocating memory to at least one application running on the computing device platform; freeing at least portions of memory on request by at least one of the applications; and preventing any of the applications from intrusively accessing memory space that has been allocated to any of the other applications.

Administrator 215 may refer to a module within or associated with runtime execution environment 220 that serves to receive at least a portion of an application, program, method, function, or other assemblage of programmable and executable code for execution in runtime execution environment 200. Further, in accordance with at least one example implementation of load balancing 120, administrator 215 may coordinate with memory manager 210 to control the behavior of the application, program, method, function, or other assemblage of programmable and executable code within runtime execution environment 220, at compile time, initial runtime, or at any time thereafter during execution of an application.

Execution component 220 may refer to a module within or associated with runtime execution environment 200 that serves to enable execution of managed code for the computing device platform. Execution component 220 may be regarded as the environment in which execution of the code of the application is implemented, and in which runtime services (e.g., device access and memory management) may be provided.

Figure 3:
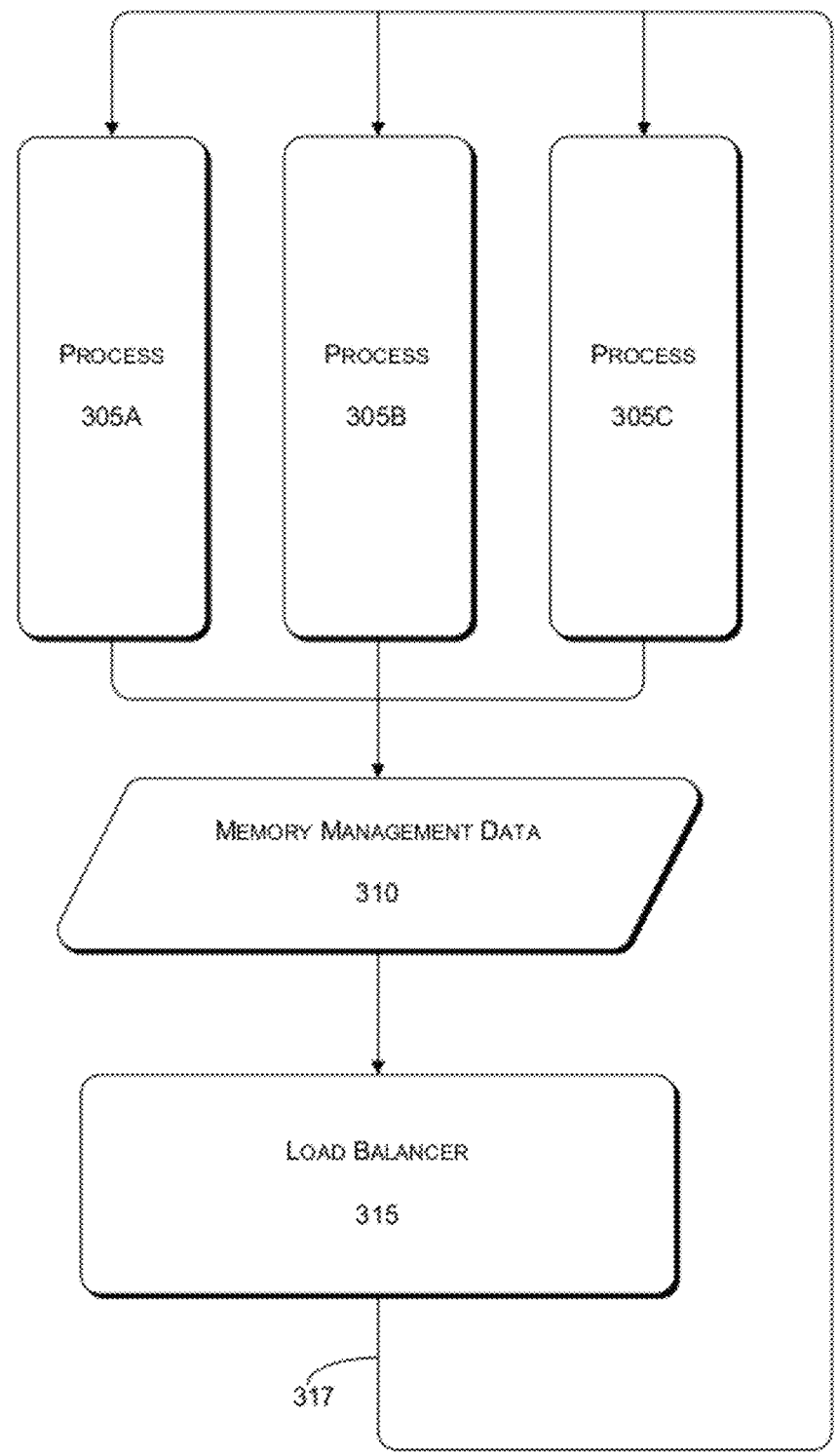
FIG. 3 shows an example data flow among data nodes in accordance with an example implementation of load balancing.

FIG. 3 shows example data flow 300 in accordance with an example implementation of load balancing 120 (see FIG. 1). Example data flow 300 is presently described with references to features from FIGS. 1 and 2, although such implementations are provided only as examples and are not intended to be construed in any limiting manner.

Processes 305A, 305B, and 305C may be regarded as logical or physical constructs, in accordance with at least the description of "isolation boundaries" provided above. Thus, processes 305A, 305B, and 305C may pertain to machine boundaries, process boundaries, threads, application domains, and class or assembly boundaries, in accordance with various implementations of load balancing 120. Further, the implementations of load balancing 120 are in no way limited to three such constructs (i.e., 305A, 305B, and 305C), which are illustrated and explained herein only for descriptive purposes.

As an example, processes 305A, 305B, and 305C may pertain to multiple servers (i.e., machine boundaries). Implemented as hardware, servers 305A, 305B, and 305C may be separate hardware devices, on which at least one runtime execution environment 200 is running as an application execution platform. Implemented as software servers, processes 305A, 305B, and 305C may be modularized components of a common application, program, method, function, or other assemblage of programmable and executable code being executed by an implementation of runtime execution environment 200.

Memory management data 310, originating from at least one of processes 305A, 305B, and 305C, may include data referring to an impending sweep or scan of a memory heap (i.e., GC) to free (i.e., de-allocate) one or more objects that are no longer used by an application, program, method, function, or other assemblage of code being executed by an implementation of runt e execution environment 200.

By the example in which processes 305A, 305B, and 305C are implemented as separate hardware devices, memory management data 310 may originate from an implementation of runtime execution environment 200 running on one or more of such devices. By the example in which processes 305A, 305B, and 305C are implemented as modularized components of a common application, program, method, function, or other assemblage of programmable and executable code, memory management data 310 may originate from an implementation of runtime execution environment 200 on which the modularized components are being executed. More particularly, by the above examples, memory management data 310 may originate from memory manager 210 or administrator module 215, either singularly or combined.

Memory management data 310 may implement transactions by using one or more application program interfaces (API) that are compatible with APIs of various system architectures. More particularly, the APIs corresponding to memory management data 310 may be capable of initiating load balancing among processes 305A, 305B, and 305C (i.e., across machine boundaries, process boundaries, threads, application domains, and class or assembly boundaries) in accordance with various implementations of load balancing 120. As described herein, an API may be regarded as one or more routines used by an application, program, method, function, or other assemblage of programmable and executable code to direct the performance of procedures by runtime execution environment 200 or even an operating system.

Memory management data 310 may include one or more APIs implemented by memory manager 210 or administrator module 215, either singularly or combined. The nomenclature for such APIs listed and described below is provided for descriptive purposes, and are provided as non-limiting examples.

MaxGenerationNotifier may refer to a class of which instantiations may be intended to prompt load balancer 315 to redistribute at least a portion of the same or another application, program, method, function, or other assemblage of code being executed by a particular implementation of runtime execution environment 200. More particularly, MaxGenerationNotifier may be instantiated when memory manager 210 or administrator 215, either singularly or combined, detect that an impending GC on runtime execution environment 200 may run so long as to cause a time-out in the execution of the same or another application, program, method, function, or other assemblage of code on runtime execution environment 200. Such detection may be based upon the allocation of the threshold amount of memory heap during the current execution of the application, program, method, function, or other assemblage of code. Effectively, then, an instantiation of MaxGenerationNotifier may provide load balancer with a proactive notification of the state of runtime execution environment 200.

More particularly, MaxGenerationNotifier may be instantiated when memory manager 210 or administrator 215, either singularly or combined, detect that an impending GC may potentially exceed a threshold logical or physical magnitude. For example, MaxGenerationNotifier may be instantiated when memory manager 210 or administrator 215, either singularly or combined, detect that the impending GC is an implementation of a late generation GC, and therefore is likely to sweep or scan the largest amount of heap (e.g., 2 GB) permitted under currently-available processing capabilities. As a result, execution of an application, program, method, function, or other assemblage of code may time-out before completion of the late-generation GC since managed threads may be suspended during a sweep or scan of a memory heap. Thus, before a GC of such magnitude begins. MaxGenerationNotifier may be instantiated to notify load balancer 315 of at least a need to redistribute at least a portion of the execution of the application, program, method, function, or other assemblage of code.

Of course, the 2 GB heap is described above only as an example of a late-generation GC. The magnitude of an impending GC that may act as a catalyst for instantiation of MaxGenerationNotifier may vary based on myriad of factors, and may increase as process ng capabilities evolve. Such factors may relate to process ng capabilities of the processing device as well as time anticipated for the GC to complete. Further, the preference of the programmer who wrote the executing application, program, method, function, or other assemblage of code, as indicated to administrator 215, may also initiate an instantiation of MaxGenerationNotifier, when the programmer is motivated by at least one of efficiency and security concerns.

Further still, at least one alternative implementation of MaxGenerationNotifier may include one or more specific instructions for redirecting execution for at least a portion of the corresponding application, program, method, function, or other assemblage of code being executed by runt me execution environment 200.

MaxGenerationCompleteNotifier may refer to a class of which instantiations are intended to notify load balancer 315 that the CC instantiated by MaxGenerationNotifier has been completed. Therefore, an instantiation of MaxGenerationCompleteNotifier may serve to notify load balancer 315 that redistribution of one or more portions of the executing application, program, method, function, or other assemblage of code may cease without adversely affecting execution by runtime execution environment 200. More particularly, the MaxGenerationNotifier may be instantiated when memory manager 210 or administrator 215, either singularly or combined, detect at least one of: completion of the GC that served as catalyst of a most recent instantiation of MaxGenerationNotifier; a predetermined threshold of time has passed since the instantiation of MaxGenerationNotifier; or another programmed module of code has been executed for the currently executing application, program, method, function, or other assemblage of code.

Load Balancer 315 may refer to a either a hardware device that is physically separate from either of client device 105 or as firmware or software component on at least one of client device 105 or server devices 110A and 110B.

Upon an instantiation of MaxGenerationNotifier, load balancer 315 may redistribute processing of at least portions of a currently executing application, program, method, function, or other assemblage of code to avoid a time-out during GC. For example, upon receiving memory management data 310 which includes an instantiation of MaxGenerationNotifier referring to an impending GC on process 305A, load balancer 315 may receive one or more requests for execution of portions of the same or another currently executing application, program, method, function, or other assemblage of code, and re-direct such execution to at least one of process 305B and process 305C.

Upon an instantiation of MaxGenerationCompleteNotifier, load balancer 315 may cease redistribution of processing of portions of a currently executing application, program, method, function, or other assemblage of code to process 305B and process 305C. Thus, load balancer 315 may have the option of having the balance of the currently executing application, program, method, function, or other assemblage of code executed on process 305A.

At least one alternative implementation of data flow 300 does not include load balancer 315. That is such alternative implementations achieves load balancing by having processes 305A, 305B, and 305C

Figure 4:
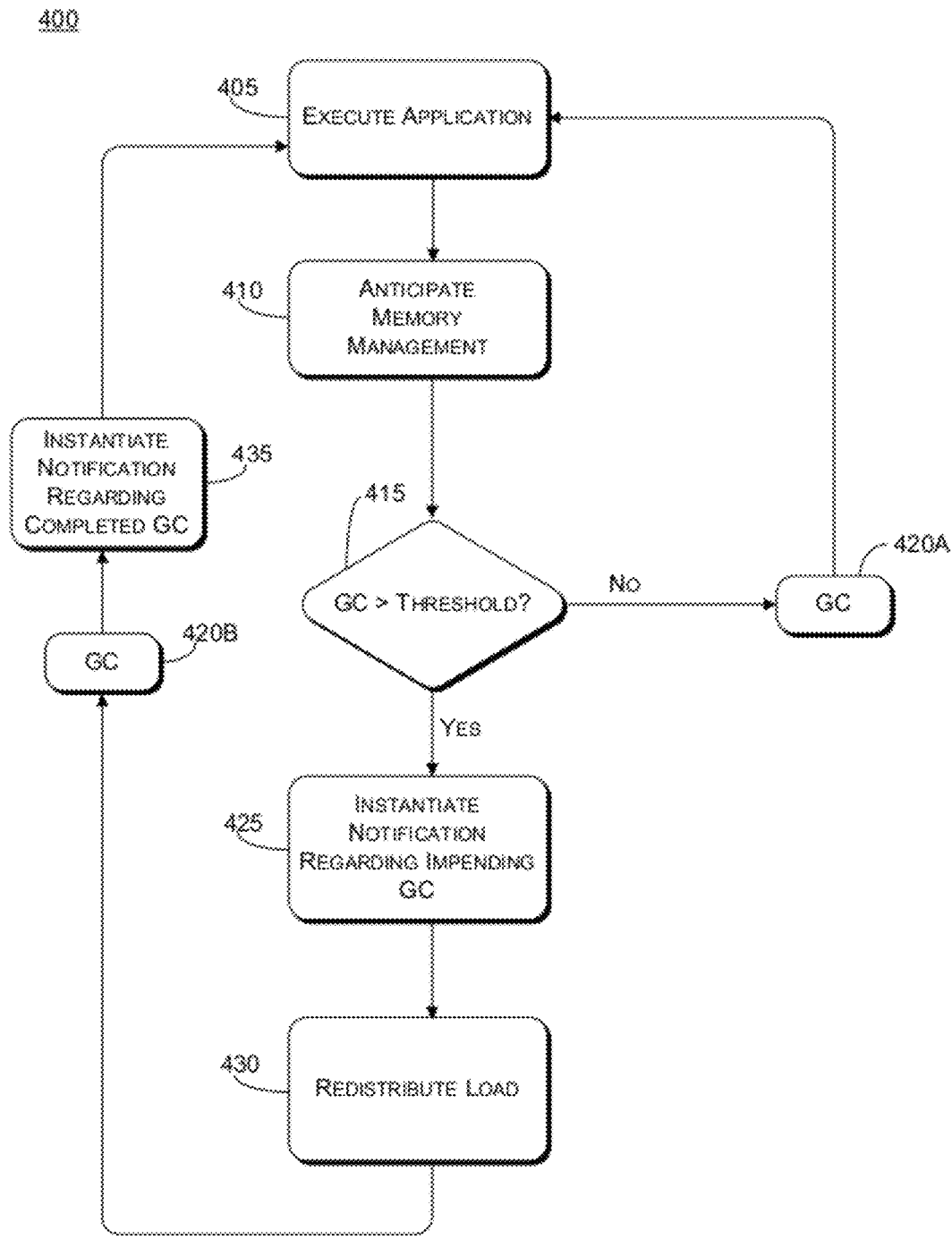
FIG. 4 shows an example processing flow in accordance with an example implementation of load balancing.

FIG. 4 shows example processing flow 400 corresponding to at least one example implementation of load balancing 120 (see FIG. 1). Example processing flow 400 is described below with references to features from FIGS. 1-3, although such implementations are provided only as examples and are not intended to be construed in any limiting manner.

Block 405 may refer to execution of at least a portion of an application, program, method, function, or other assemblage of code being implemented as part of process 305A, process 305B, or process 305C, either singularly or collaboratively in various combinations. Although load balancing 120 is not so limited, block 405 may refer to execution in a managed execution environment (i.e., runtime execution environment 200).

Block 410 may refer to memory manager 210 or administrator 215, either singularly or in combination, determining that a threshold amount of heap has already been allocated during execution of a currently executing application, program, method, function, or other assemblage of code, and therefore a GC may be impending. Alternatively, block 410 may refer to memory manager 210 or administrator 215, either singularly or in combination, inspecting at least a portion of the programmed code to determine that a sweep or scan of a memory heap of the processing device upon which runtime execution environment 200 is running may be impending.

Decision 415 may refer to memory manager 210 or administrator 215, either singularly or in combination, assessing the magnitude of the anticipated GC implementation relative to a predetermined threshold value. The assessment may be made to determine whether the physical magnitude of the memory heap exceeds a predetermined threshold value (e.g., 2 GB or more) that would likely time-out execution of a currently executing application, program, method, function, or other assemblage of code. According to one alternative, the assessment may be made of the time anticipated for the GC to complete against a predetermined time threshold for avoiding a time-out. According to yet another example, the assessment may even include inspecting at least a portion of the programmed code to determine whether the impending GC is deliberately intended to serve as a catalyst for at least portions of the executing application, program, method, function, or other assemblage of code to be redistributed.

Block 420A, subsequent to negative decision 415, may refer to memory manager 210 implementing GC for the executing application, program, method, function, or other assemblage of code on the host one of processes 305A, 305B, or 305C. Processing flow may then return to block 405 to continue execution of the currently executed application, program, method, function, or other assemblage of code.

Block 425, subsequent to positive decision 415, may refer to memory manager 210 or administrator 215, either singularly or in combination, notifying load balancer 315 that the anticipated GC meets or exceeds the predetermined threshold values. That is, upon determining that a logical or physical parameter of the anticipated CC is expected to exceed a threshold value, management module 210 or administrator 215, either singularly or in combination, may notify load balancer that the impending GC is likely to cause a time-out for a currently executed application, program, method, function, or other assemblage of code. Even more particularly, management module 210 or administrator 215, either singularly or in combination, may instantiate an API (e.g., MaxGenerationNotifier), which provides a notification of anticipated state.

In at least one alternative implementation of block 425, memory manager 210 or administrator 215, either singularly or in combination, may provide a notification in another form. For example, the notification may be an event that includes calling the application, program, method, function, or other assemblage of code that is executed as part of process 305A, process 305B, or process 305C previously registered with memory manager 210 or administrator 215.

An example of such a notification event may include each of processes 305A, 305B, and 305C in FIG. 3 subscribing to the one or more memory management events (e.g., MaxGenerationNotifier) via memory manager 210 or administrator 215 either singularly or combined. For example, process 305A may implement two functions that may be called when MaxGenNotifier is issued by memory manager 210 or administrator 215 either singularly or in combination. Non-limiting examples of such calls are as follows;

(1) GC.MaxGenerationNotifier+=new MaxGenerationNotificationHandler(On_MaxGeneration_Notify1);

(2) GC.MaxGenerationNotifier+=new MaxGenerationNotificationHandler(On_MaxGeneration_Notify2);

whereby MaxGeneration_Notify1 and MaxGeneration_Notify2 are the aforementioned functions. Further, functions MaxGeneration_Notify1 and MaxGeneration_Notify2 may notify load balancer 315 of the subscribed events. Therefore, upon occurrence of a subscribed event, load balancer 315 may take requested load balancing action.

Block 430 may refer to load balancer 315 redistributing at least portions of the currently executed application, program, method, function, or other assemblage of code among processes 305A, 305B, and 305C. Thus, for example, if the notification at block 425 is received in anticipation of a GC implementation in accordance with host process 305A, block 430 may refer to load balancer 315 receiving a request for execution of at least a portion of the same or another currently executed application, program, method, function, or other assemblage of code, and re-direct the requested execution to at least one of processes 305B and 305C. That is, block 430 may refer to load balancer 315 redistributing at least portions of the currently executed application, program, method, function, or other assemblage of code from currently running process 305A to a concurrently running one of processes 305B and 305C.

Block 420B may refer to memory manager 210 implementing GC for the executing application, program, method, function, or other assemblage of code on the host one of processes 305A, 305B, or 305C, while at least portions of the respective application, program, method, function, or other assemblage of code are being executed on others of concurrently running processes 305A, 305B, and 305C. Thus, for example, if the notification at block 425 is received in anticipation of a GC implementation in accordance with host process 305A, block 430 may refer to load balancer 315 redistributing at least portions of the current y executed application, program, method, function, or other assemblage of code to at least one of processes 305B and 305C, and block 420A may refer to memory manager 210 implementing GC on host process 305A.

Block 435 may refer to memory manager 210 or administrator 215, either singularly or in combination, notifying load balancer 315 that the GC has been completed. The notification may or may not include instructions to cease a current load balancing implementation. Even more particularly, management module 210 or administrator 215, either singularly or in combination, may instantiate an API (e.g., MaxGenerationNotifier), which provides a notification of current state. Processing flow may then return to block 405 to continue execution of a currently executed application, program, method, function, or other assemblage of code.

Similar to processing at block 425, a notification event may include each of processes 305A, 305B, and 305C in FIG. 3 subscribing to the one or more memory management events (e.g., MaxGenerationCompleteNotifier) via memory manager 210 or administrator 215 either singularly or combined. Thus, for example, process 305A may implement two functions that may be called when MaxGenCompleteNotifier is issued by memory manager 210 or administrator 215 either singularly or in combination. Non-limiting examples of such calls are as follows:

(1) GC.MaxGenerationCompleteNotifier+=new MaxGenerationCompleteNotificationHandler(On_MaxGenerationComplete_Notify1);
(2) GC.MaxGenerationCompleteNotifier+=new MaxGenerationCompleteNotificationHandler(On_MaxGenerationComplete_Notify2);

whereby MaxGenerationComplete_Notify1 and MaxGenerationComplete_Notify2 are the aforementioned functions. Further, functions MaxGenerationComplete_Notify1 and MaxGenerationComplete_Notify2 may notify load balancer 315 of the subscribed events. Therefore, upon occurrence of a subscribed event, load balancer 315 may at least temporarily cease load balancing, as requested.

The description above, pertaining to FIGS. 1-4, load balancing with regard to one or more applications executing on a runtime execution environment may be implemented in accordance with data associated with memory management data. However, the example limitations described herein are not limited to just load balancing based on memory management data. Rather, a notification (i.e., notification) may be instantiated to implement load balancing based on myriad logical and physical criteria.

The computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards. CD-ROM, digital versatile disks (DVD) or other optical storage, random access memories (RAM), read only memories (ROM), electric erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementations and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method comprising:
load balancing, by a computing device, at least a portion of executing code in response to determining that an impending garbage collection of heap memory is likely to cause a time-out of the executing code, the load balancing including moving the portion of executing code from a currently running process to a different concurrently running process, the determining that the impending garbage collection of heap memory is likely to cause a time-out of the executing code including at least one of:
determining an amount of the heap memory that has already been allocated exceeds a predetermined threshold value of heap memory; and
determining a first duration of time required for completing the impending garbage collection of heap memory exceeds a second duration of time sufficient to cause the time-out of the executing code, the first duration of time is calculated based on size of heap memory to be garbage collected; and
performing the impending garbage collection on the currently running process.

2. The method of claim 1 where the determining that the impending garbage collection of heap memory is likely to cause a time-out of the executing code includes determining the amount of the heap memory that has already been allocated exceeds the predetermined threshold value of heap memory.

3. The method of claim 1 where the determining that the impending garbage collection of heap memory is likely to cause a time-out of the executing code includes determining the first duration of time required for completing the impending garbage collection of heap memory exceeds the second duration of time sufficient to cause the time-out of the executing code.

4. The method of claim 1 where the determining includes further determining that the impending garbage collection is intended to serve as a catalyst for the load balancing.

5. The method of claim 1 where the further determining is based on inspecting at least a portion of code.

6. The method of claim 1 further comprising performing the impending garbage collection on the currently running process while the portion of executing code executes on the different concurrently running process.

7. At least one hardware computer readable media comprising:

hardware memory that comprises computer-executable instructions that, based on execution by a computing device, configure the computing device to perform actions comprising:

load balancing at least a portion of executing code in response to determining that an impending garbage collection of heap memory is likely to cause a time-out of the executing code, the load balancing including moving the portion of executing code from a currently running process to a different concurrently running process, the determining that the impending garbage collection of heap memory is likely to cause a time-out of the executing code including at least one of:
  determining an amount of the heap memory that has already been allocated exceeds a predetermined threshold value of heap memory; and
  determining a first duration of time required for completing the impending garbage collection of heap memory exceeds a second duration of time sufficient to cause the time-out of the executing code, the first duration of time is calculated based on size of heap memory to be garbage collected; and
performing the impending garbage collection on the currently running process.

8. The at least one hardware computer readable media of claim 7 where the determining that the impending garbage collection of heap memory is likely to cause a time-out of the executing code includes determining the amount of the heap memory that has already been allocated exceeds the predetermined threshold value of heap memory.

9. The at least one hardware computer readable media of claim 7 where the determining that the impending garbage collection of heap memory is likely to cause a time-out of the executing code includes determining the first duration of time required for completing the impending garbage collection of heap memory exceeds the second duration of time sufficient to cause the time-out of the executing code.

10. The at least one hardware computer readable media of claim 7 where the determining includes further determining that the impending garbage collection is intended to serve as a catalyst for the load balancing.

11. The at least one hardware computer readable media of claim 7 where the further determining is based on inspecting at least a portion of code.

12. The at least one hardware computer readable media of claim 7, the actions further comprising:
performing the impending garbage collection on the currently running process while the portion of executing code executes on the different concurrently running process; and
issuing, after performance of the impending garbage collection is complete, a notification indicating that the performance of the impending garbage collection is complete.

13. A computing device comprising:
a processor;
heap memory;
a memory manager, and
a load balancer via which the computing device load balances at least a portion of executing code in response to a determination by the memory manager that an impending garbage collection of the heap memory is likely to cause a time-out of the executing code, the load balancing including moving the portion of the executing code from a currently running process to a different concurrently running process the determination that the impending garbage collection of the heap memory is likely to cause a time-out of the executing code including at least one of:
  determination of an amount of the heap memory that has already been allocated exceeds a predetermined threshold value of heap memory; and
  determination of a first duration of time required for completing the impending garbage collection of heap memory exceeds a second duration of time sufficient to cause the time-out of the executing code, the first duration of time is calculated based on size of heap memory to be garbage collected;
the memory manager to perform the impending garbage collection on the currently running process.

14. The computing device of claim 13 where the determination that the impending garbage collection of the heap memory is likely to cause a time-out of the executing code includes determination of the amount of the heap memory that has already been allocated exceeds the predetermined threshold value of heap memory.

15. The computing device of claim 13 where the determination that the impending garbage collection of heap memory is likely to cause a time-out of the executing code includes determination of the first duration of time required for completing the impending garbage collection of heap memory exceeds the second duration of time sufficient to cause the time-out of the executing code.

16. The computing device of claim 13 where the determination is further based on the impending garbage collection being intended to serve as a catalyst for the load balancing, or where the determination is further based on inspecting at least a portion of code.

17. The computing device of claim 13, the memory manager to perform the impending garbage collection on the currently running process while the portion of executing code executes on the different concurrently running process.

* * * * *